Oct. 10, 1950             R. CRAMER, JR             2,524,961
ADJUSTABLE LEVELING SUPPORT COMPRISING
IDENTICAL COACTING WEDGES
Filed Sept. 24, 1948

INVENTOR.
ROBERT CRAMER, JR.
BY
Wheeler, Wheeler & Wheeler
ATTORNEYS

Patented Oct. 10, 1950

2,524,961

UNITED STATES PATENT OFFICE 2,524,961

ADJUSTABLE LEVELING SUPPORT COMPRISING IDENTICAL COACTING WEDGES

Robert Cramer, Jr., Hales Corners, Wis.

Application September 24, 1948, Serial No. 50,952

4 Claims. (Cl. 254—104)

This invention relates to an adjustable levelling support comprising identical co-acting wedges.

It is common to use various types of adjustable supports for heavy machinery and the like in order that the supported device may be accurately levelled. It is an object of the present invention to provide such a support in a form which is inexpensive by reason of the fact that the component and co-acting wedges making up the support are identical, being cast from the same mold and designed for operation by a conventional bolt. More specifically, it is my purpose to provide identical wedges, each of which has parts for co-acting with the head of a conventional bolt, parts for co-acting with the nut of a conventional bolt, and parts for the guidance on the intermediate or shank portion of a conventional bolt.

These and other objects of the invention will be made more clearly apparent in the following disclosure thereof.

Figure 1:
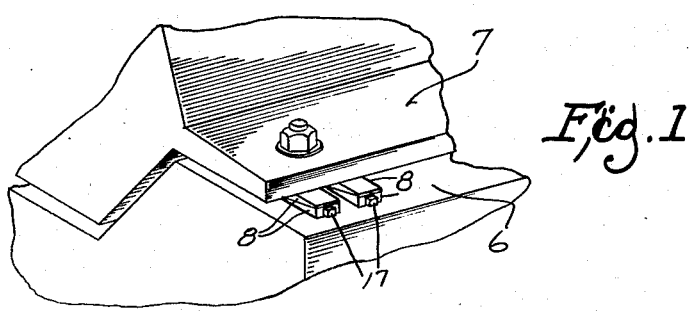
Fig. 1 is a fragmentary view in perspective showing a pair of supports embodying my invention as they appear in use.

At 6 I have illustrated a base for a piece of heavy machinery which is shown at 7. Interposed between the base and the machinery I have illustrated a pair of the adjustable levelling supports hereinafter to be described. It will be understood that any desired portion of the machinery may be carried on any desired number of supports. Two are shown in Fig. 1 to illustrate the fact that the levelling supports are not necessarily used singly, where the weight of the supported device is too great to be properly adjusted or sustained upon one support.

Figure 3:
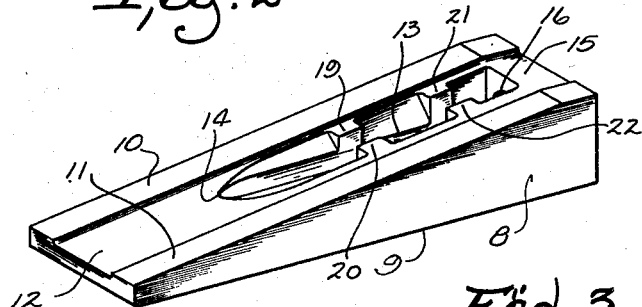
Fig. 3 is a view in perspective of one of the component wedges used as a part of my improved support.

As above indicated, my support comprises a pair of identical wedges, each of the construction separately illustrated at 8. As shown in Fig. 3, each wedge 8 has a plane surface 9 and two laterally spaced inclined plane surfaces at 10, 11. Between the inclined plane surfaces 10 and 11, the wedge is desirably channelled or relieved at 12, and within the channel I provide a recess 13 which may run out at 14 intermediate the ends of the wedge. At its deep end, the recess 13 terminates at a transverse wall 15 which has a bolt-receiving aperture at 16 and a flat outer surface which, in the case of one of the wedges, is abutted by the head 17 of a conventional bolt 18.

The recess 13 is, throughout most of its length, desirably much wider than the shank of bolt 18. However, the recess is provided at two points with buttresses extending laterally from the side walls of the recess into spaced proximity just sufficient to clear the shank of the bolt. These buttresses are most clearly illustrated in Fig. 3. One pair of buttresses shown at 19, 20 is near the center of the wedge. The other pair of buttresses shown at 21, 22 is between the first pair of buttresses and the end wall 15 above described.

Figure 2:
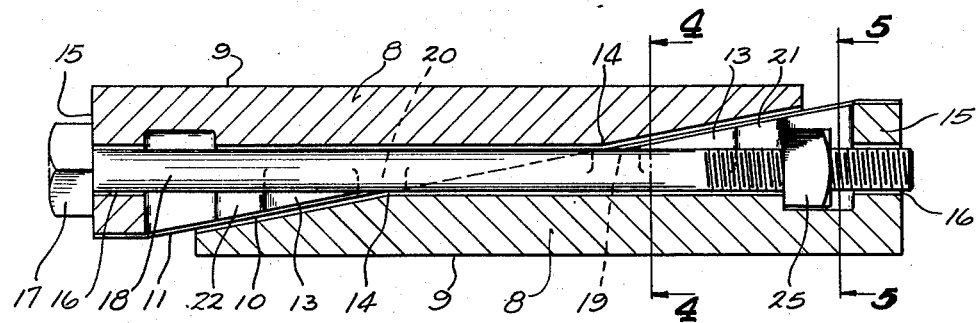
Fig. 2 is a view in longitudinal section on an enlarged scale through an adjustable support embodying my invention.
Figure 4:
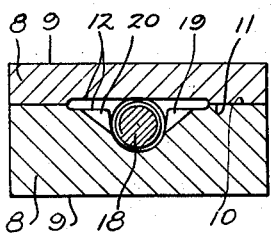
Fig. 4 is a view in transverse cross section taken on the line 4—4 of Fig. 2.
Figure 5:
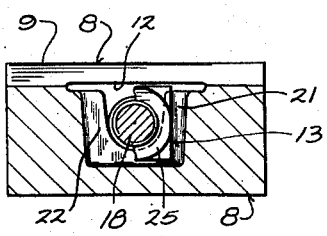
Fig. 5 is a view in transverse cross section taken on the line 5—5 of Fig. 2, portions of the nut being broken away.

When one of the identical wedges is inverted over the other, and a bolt 18 is placed therein as shown in Figs. 2, 4 and 5, the head 17 of the bolt engages the outer surface of the end wall 15 of one of the wedges, while the nut 25 of the bolt engages the faces of the buttresses 21, 22 of the opposite wedge. Between these points of engagement, the bolt is confined by the buttresses 21, 22 and 19, 20 of the inverted wedge and the buttresses 19, 20 of the lowermost wedge which is right side up. Thus, the bolt acts as a key to keep the respective wedges in alignment with their inclined plane surfaces 10 and 11 in operative bearing contact.

It is to be noted that the bolt may be inserted in either direction and still function in the same manner, each wedge being provided with a surface which is operatively engageable by the head of the bolt, and each wedge being provided with bosses or abutments operatively positioned to be engaged by the nut. The bosses or abutments 21, 22, which, in one wedge are engaged by the nut, are also operative in the other wedge, but in a different capacity—namely, to engage the sides of the bolt 18 and thereby to key the two wedges for proper sliding movement rectilinearly of each other.

These several results are achieved in a construction which is so simple that it can be made at a minimum of expense, being easily cast and using wedges which do not need to be formed in "rights" and "lefts," a single part being duplicated for service both as top and lower wedge.

That portion of the recess 13 which receives the nut 25 is desirably not much wider than the transverse dimension of the nut, whereby the nut is held in the recess against rotation. Thus, in use, the supports are set beneath the supported machinery or other equipment shown at 7 with the bolt head 17 exposed outwardly, whereby a wrench applied to the bolt head may be used to increase or decrease the over-all height of the respective support. The increase in height is effected positively by thrust of the nut and the bolt head to cause the upper wedge to climb on the lower wedge. The decrease in height is effected by loosening the bolt and tapping on the head thereof which causes the upper wedge to slide downwardly.

For freedom of movement in both directions, the inclined plane surfaces 10 and 11 of the respective wedges are desirably machined (this merely requiring surface grinding), but it will be noted that these are the only surfaces of the entire wedge which require machine work, all other surfaces being cast. The machined surfaces are desirably lubricated in practice, principally to protect against rust.

I claim:

1. As a new article of manufacture, a wedge adapted to be associated with an identical wedge to constitute a levelling device, said wedge having laterally spaced inclined plane surfaces and an intervening channel, a recess in the wedge opening outwardly into said channel intermediate the ends of the wedge and wide enough adjacent one end of the wedge to provide a nut-receiving pocket, the last mentioned wedge end comprising a terminal wall closing said recess and being provided with a bolt opening communicating therewith.

2. The wedge of claim 1 in which said pocket is defined in part by said terminal wall and in part by buttresses extending into said recess at each side thereof and adapted to be engaged by a nut in said pocket, said buttresses being provided with bolt clearance between them for passing a bolt extending through said aperture.

3. As a new article of manufacture, a wedge adapted for use in a levelling device of the character described, said wedge having laterally spaced inclined plane means, and a longitudinally extending recess centrally disposed therebetween, a terminal wall at one end of said wedge and provided with an opening into said recess, spaced buttresses integral with said wedge and projecting laterally into the recess from opposite sides thereof in spaced relation to the wall, said buttresses being spaced from each other to provide bolt-receiving clearance in substantial alignment with the opening in the wall, another pair of spaced buttresses integral with the wedge and projecting into said recess from opposite sides thereof intermediate the ends of said wedge, the space therebetween being aligned with the opening in the wall and the space between the buttresses first mentioned, said recess running out between the last mentioned buttresses and the end of the wedge remote from said wall.

4. A levelling device comprising a pair of identical wedges, each having a thick end and a thin end, each wedge having at its thick end a transverse wall provided with a bolt-receiving opening, each wedge being provided with a centrally disposed recess deepest adjacent its thick end and running out toward its thin end, the wedges having complementary laterally spaced inclined plane surfaces extending continuously between their thick and thin ends respectively and in mutual contact, and each wedge being provided with spaced buttresses integral with the respective wedges and projecting into the recess from opposite sides thereof, the said buttresses being spaced in each wedge from the end wall thereof to provide a nut-receiving pocket, together with a bolt having its head bearing against the external surface of the transverse wall of one wedge and extending through the recess thereof and between the buttresses thereof into the recess of the other wedge and between its buttresses and provided with a nut in the said pocket of the other wedge, said nut being engaged with the buttresses of the wedge last mentioned, and the bolt serving to guide said wedges for relative reciprocative movement upon their contacting inclined plane surfaces.

ROBERT CRAMER, Jr.

REFERENCES CITED

The following references are of record in the file of this patent:

UNITED STATES PATENTS

| Number | Name | Date |
| --- | --- | --- |
| 2,164,615 | Mafera | July 4, 1939 |